W. M. SANDERS.
NUT LOCK.
APPLICATION FILED APR. 15, 1912.
1,042,484.
Patented Oct. 29, 1912.
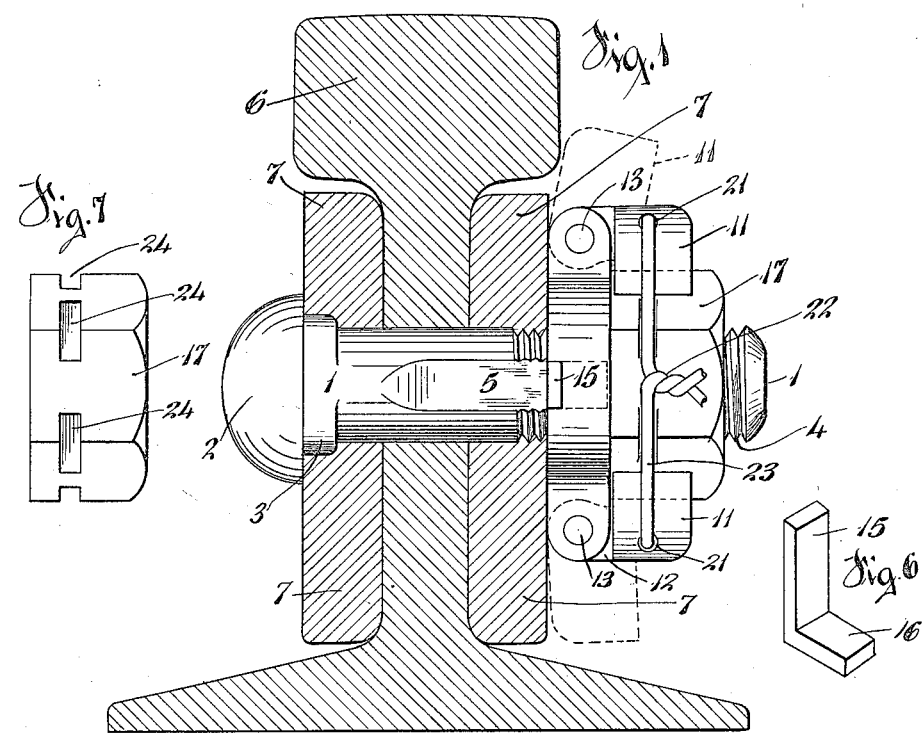
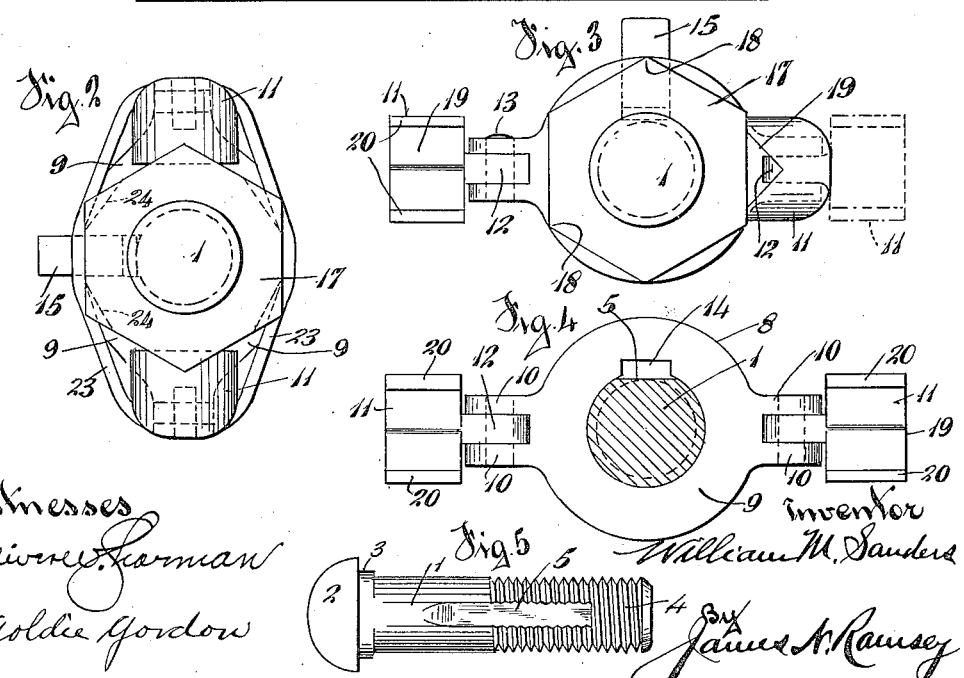

UNITED STATES PATENT OFFICE.

WILLIAM M. SANDERS, OF CINCINNATI, OHIO.

NUT-LOCK.

1,042,484.  Specification of Letters Patent.  Patented Oct. 29, 1912.

Application filed April 15, 1912. Serial No. 690,690.

*To all whom it may concern:*

Be it known that I, WILLIAM M. SANDERS, a citizen of the United States, residing at Cincinnati, in the county of Hamilton and State of Ohio, have invented certain new and useful Improvements in Nut-Locks, of which the following is a specification.

My invention relates to nut locking devices.

The object of my invention is to provide a simple locking device of great efficiency and durability to be used particularly in connection with bolts and nuts for rails and the like.

My invention consists of a bolt having a portion of the periphery of the threads flattened to form a flat narrow surface on the threaded portion of the bolt to allow a key to slide thereon, a washer having wings pivoted thereto, said wings being adapted to engage a nut when said nut is placed on the threaded portion of the bolt, a wire passing through suitable apertures in said wings when said wings are clamping said nut, said wire being adapted to be fastened, thereby holding said nut and said wings in close engagement with each other, and a key adapted to prevent the circumferential movement of said washer on said bolt.

My invention also consists in the combination of parts as herein set forth and claimed.

In the accompanying drawing which serves to illustrate the construction, application and use of my invention: Figure 1 is a cross-sectional view of a rail showing the fish plate in position and my improved nut locking device mounted thereon and made in accordance with my invention; Fig. 2 is a side elevation of the bolt and nut locking device shown in Fig. 1; Fig. 3 is a similar view showing the locking device with the wings adapted to engage the flattened surfaces of the nut, showing one wing in engagement and the other wing out of engagement with said nut; Fig. 4 is a view of the washer, the wings of which are in their outermost or open position, the bolt being shown in cross-section to show how the threads are flattened to form a flat surface for the key and to also show the key way in said washer; Fig. 5 is a detail view of the bolt; Fig. 6 is a perspective view of the key; and Fig. 7 is a detail view of the nut showing the slots cut therein for purposes which will be described.

In the embodiment of my invention as illustrated and which shows a preferred construction 1 represents a bolt which is of the type in common use on railroads. The bolt has a head 2, an elongated shoulder 3 to prevent it from turning and threads 4 at the end thereof. The bolt 1 is provided with a narrow flat surface 5 in the threads thereof as best shown in Fig. 5. The bolt 1 is shown mounted in a rail 6 having fish plates 7 at each side. When the bolt is mounted in said rail and fish plates, I place my improved locking device 8 thereon. Said device 8 consists of a washer portion 9 adapted to surround the bolt 1 and said washer portion has ears 10 at each side and diametrically opposite each other to which are pivoted wings 11. When this locking device is placed on the bolt 1 the wings 11 are in their open position as shown in Fig. 4 and in dotted lines in Fig. 1, thereby allowing free movement of the wrench when tightening the nut. These wings 11 are provided with a lug or extension 12 which is suitably pivoted to the ears 10 on the washer portion 9 of the locking device and held thereto by means of a pin 13. The washer portion is provided with an aperture through which the bolt passes and has a key-way 14 therein adapted to receive the key 15 (best shown in Fig. 6). The key 15 is angular in shape, the portion 16 being adapted to enter the key-way 14 and engage the flattened surface 5 on the bolt 4. The locking device is placed on the bolt as far as desired and butts against the fish plate 7 as is shown in Fig. 1 thereby leaving plenty of room on the bolt for the nut 17.

After the nut is tightened sufficiently on the bolt 1, the wings 11 are brought to the position shown in Fig. 1 to engage the nut 17. If the nut does not happen to be turned to the proper position so that one of the corners 18 engages the wings 11, said wings will engage the flat portions or facets of the nut equally well if said facets come to rest broadside to the wings 11. The wings 11 have a V-shaped recess 19 therein which is adapted to engage or receive the corners 18 of the nut. However, the recess 19 is placed in such a manner as to leave flattened surfaces 20 on the engaging sides of the wings 11 so that they will engage the facets of the nut in case it happens to assume the position shown in Fig. 3 when sufficiently tightened.

When the wings are placed in position to engage the nut, I thread a wire 23 through the apertures 21 in the wings 11 and preferably fasten the wire at its ends by twisting said ends as shown at 22 in Fig. 1. In order that the wire 23 may not rest upon the sharp corners 18 of the nut I provide slots 24 across each corner of the nut as best shown in Fig. 7 thus preventing the wire from being cut in case it were given a hard blow while resting on the corners 18 of the nut. When the wire is securely fastened and tightened it is readily seen that the nut is absolutely held in that position and cannot possibly be loosened without releasing the wire 23. The locking device 8 cannot turn owing to the fact that the key 15 holds it from circumferential movement upon the bolt by said key engaging the surface 5 on the bolt, and the bolt cannot turn due to the shoulder 3 adjacent the head 2 of the bolt.

The flat surface 5 on the threaded portion of bolt 1 need not extend the whole distance on the thread portion which if it did would weaken the threads a certain amount where the nut engages them but the flattened surface only extends the distance indicated in Fig. 5 thus allowing the nut 17 to practically always engage the threads their entire circumferential distance.

While my device is specially adapted and intended for use to secure fish plates on railway joints it may also be used for various other purposes.

Modifications of my invention may be made without departing from the spirit or scope thereof and I do not wish to be confined to the exact details shown, but what I claim as new and desire to secure by Letters Patent is:

In a device of the character described, a bolt, a nut having slots in the sides thereof extending transversely across its angular corners, a washer against which said nut is adapted to bear, wings pivoted at the sides of said washer adapted to engage said nut and each having an aperture extending transversely therethrough in a plane corresponding to said slots and a wire passing through said apertures and resting in said slots whereby said wire is provided with a smooth engaging and holding surface with said nut, and having its ends tightly secured together, substantially as shown and for the purposes specified.

WILLIAM M. SANDERS.

Witnesses:
JAMES N. RAMSEY,
GOLDIE GORDON.

---

Copies of this patent may be obtained for five cents each, by addressing the "Commissioner of Patents, Washington, D. C."